Patented June 7, 1927.

1,631,512

UNITED STATES PATENT OFFICE.

DAVID WERNER BERLIN, OF RASUNDA, NEAR STOCKHOLM, SWEDEN, ASSIGNOR TO AKTIEBOLAGET FERROLEGERINGAR, OF STOCKHOLM, SWEDEN, A JOINT-STOCK COMPANY.

METHOD FOR PRODUCING RUSTLESS IRON AND STEEL.

No Drawing. Application filed July 20, 1923, Serial No. 652,866, and in Sweden August 28, 1922.

The present invention relates to a method for producing rustless iron and steel, and more particularly in providing chromium or chromic alloy in the form of electrodes which are introduced into an electrical furnace against a bath of molten iron whereby the electrode or electrodes melt after a time in the voltaic arc created in the passage between the electrodes and the bath or the resistance heat generated in the said passage. Eventually metal or metal oxide, mixed with reducing agents, can be directly introduced into the iron and become melted by the fusion of the electrode. The electrode or electrodes are produced from previously manufactured ferrochrome or other metal alloy or metal in the shape of solid cast pieces or of smaller pieces pressed or in some other manner attached to one another. The electrodes are heated by the electrical energy of fusion and the molten metal will, after a time, become alloyed with the metal of the bath.

As a slag will always be created on the metal bath the fusion of the electrodes will take place in this slag and the oxidizing of the metal will be prevented.

The following is an example of carrying out the invention for producing in an electrode furnace rustless iron or steel with about 15 per cent chromium.

The furnace is in the usual manner charged with chippings, these being melted by the aid of carbon electrodes. When the contents of the furnace are melted and have reached a suitable temperature, iron ore in the shape of pieces or briquettes is added for bringing the metal to the desired percentage of carbon. Then the carbon electrodes are removed and electrodes of ferrochrome are substituted therefor. When the temperature of the metal bath at or after the fusion of the electrodes becomes too high, ferrochrome, iron or other suitable ingredient for absorbing heat and regulating the temperature is added directly to the metal bath. When the chromium is introduced into the bath the surplus of the slag is removed and then it is tested so that the percentage of silicium will not be too high. The metal is then ready to be discharged.

It is specially to be noted that in this manner the method can be executed in a Martin furnace with arrangements for the electrodes, existing Martin furnaces being, therefore, applicable for the purpose.

Having now particularly described and ascertained the nature of my said invention and in what manner the same is to be performed, I declare that what I claim is:—

The method of producing rustless iron and steel, characterized by the feature that chromium or chromic alloy is formed into electrodes which are brought into an electrical furnace, against a bath of molten iron, whereby the electrodes melt after a time in the voltaic arc created in the passage between the electrodes and the bath or the resistance heat generated in the said passage.

In testimony whereof I have signed my name to this specification.

DAVID WERNER BERLIN.